(12) United States Patent
Feng et al.

(10) Patent No.: US 7,239,648 B1
(45) Date of Patent: Jul. 3, 2007

(54) EXTENSION MODE FOR WIRELESS LANS COMPLYING WITH SHORT INTERFRAME SPACE REQUIREMENT

(75) Inventors: Weishi Feng, San Jose, CA (US); Peter Loc, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 999 days.

(21) Appl. No.: 10/080,454

(22) Filed: Feb. 21, 2002

Related U.S. Application Data

(60) Provisional application No. 60/333,579, filed on Nov. 27, 2001.

(51) Int. Cl.
*H04J 3/16* (2006.01)

(52) U.S. Cl. .............. 370/470; 370/471; 370/522; 370/337; 375/147; 375/130; 375/140

(58) Field of Classification Search ........... 370/470, 370/471, 522, 517, 519; 375/147, 130, 140
See application file for complete search history.

(56) References Cited

U.S. PATENT DOCUMENTS

| | | | | |
|---|---|---|---|---|
| 5,768,695 | A * | 6/1998 | Fischer et al. ........... | 455/127.1 |
| 5,982,807 | A * | 11/1999 | Snell ...................... | 375/146 |
| 6,236,674 | B1 | 5/2001 | Morelli et al. | |
| 6,603,801 | B1 * | 8/2003 | Andren et al. .......... | 375/147 |
| 6,675,012 | B2 * | 1/2004 | Gray ...................... | 455/423 |
| 6,678,310 | B1 * | 1/2004 | Andren et al. .......... | 375/147 |
| 6,697,013 | B2 * | 2/2004 | McFarland et al. ..... | 342/159 |
| 6,721,302 | B1 * | 4/2004 | Alastalo ................. | 370/346 |
| 6,754,170 | B1 * | 6/2004 | Ward ..................... | 370/208 |
| 6,865,609 | B1 * | 3/2005 | Gubbi et al. ............ | 709/230 |
| 6,934,752 | B1 * | 8/2005 | Gubbi .................... | 709/225 |
| 6,950,397 | B1 * | 9/2005 | Ho et al. ................ | 370/235 |
| 6,970,422 | B1 * | 11/2005 | Ho et al. ................ | 370/230 |
| 6,978,149 | B1 * | 12/2005 | Morelli et al. .......... | 455/522 |
| 7,039,000 | B2 * | 5/2006 | You et al. .............. | 370/203 |

(Continued)

FOREIGN PATENT DOCUMENTS

| | | |
|---|---|---|
| JP | EP 0680 177 A2 | 4/1995 |
| JP | EP 1041 770 A2 | 3/2000 |
| JP | EP 1089 480 A2 | 9/2000 |
| NL | EP 1 119 137 A1 | 1/2000 |

(Continued)

OTHER PUBLICATIONS

ANSI/IEEE Std 802.11, 1999 Edition, *Sponsor LAN MAN Standards Committee of IEEE Computer Society*, "Part 11: Wireless LAN Medium Access Control (MAC) and Physical Layer (PHY) Specifications."

*Primary Examiner*—Wing Chan
*Assistant Examiner*—Andrew C. Lee

(57) ABSTRACT

A method and apparatus enables advanced signal processing in a wireless local area network (WLAN). First and second WLAN transceivers are provided with advanced signal processing capabilities. A maximum interframe period between data and an acknowledgement is required by the WLAN for compatibility. A duration of the interframe period is shorter than a duration that is required to perform the advanced signal processing. The first WLAN transceiver transmits a header and data. A first data field in the header is specified that enables the advanced signal processing. A second data field is specified that defines a data time period and an extension time period. The first WLAN transceiver transmits data during the data time period and dummy data during the extension time period. The second WLAN transceiver receives the header and initiates receiver processing during the extension time period.

29 Claims, 6 Drawing Sheets

U.S. PATENT DOCUMENTS

| | | | |
|---|---|---|---|
| 7,039,068 B1 * | 5/2006 | Halasz | 370/473 |
| 7,039,140 B2 * | 5/2006 | Reagan et al. | 375/355 |
| 7,054,296 B1 * | 5/2006 | Sorrells et al. | 370/338 |
| 2001/0009555 A1 | 7/2001 | Diepstraten et al. | |
| 2001/0010689 A1 | 8/2001 | Awater et al. | |

FOREIGN PATENT DOCUMENTS

| | | |
|---|---|---|
| NL | EP 1 119 153 A1 | 1/2000 |
| WO | WO 99/49636 | 3/1999 |

\* cited by examiner

FIG. 7
Prior Art
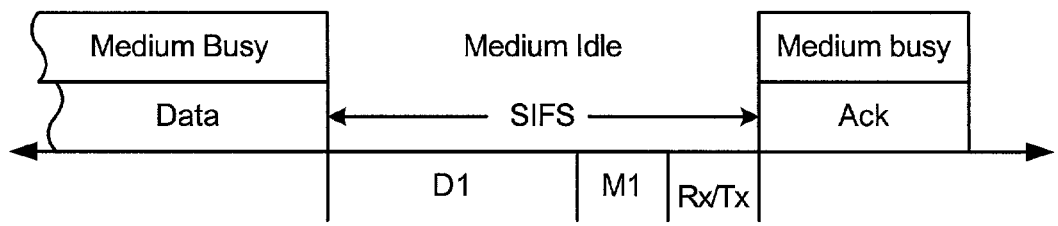
FIG. 8
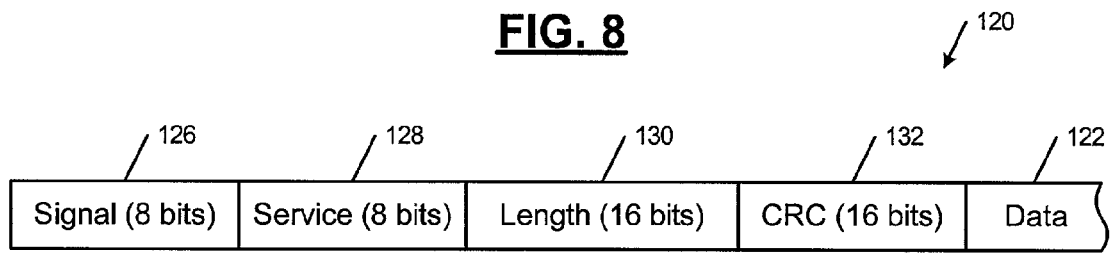
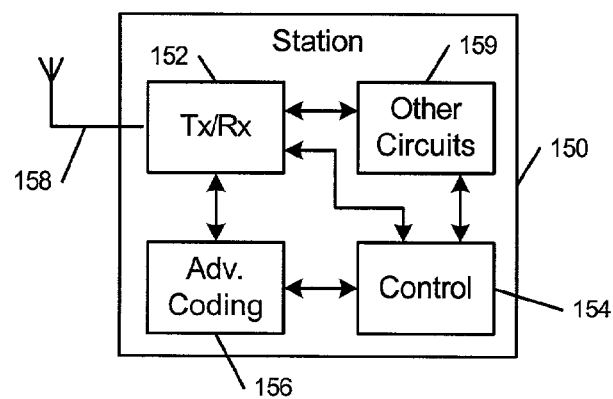
FIG. 9

US 7,239,648 B1

EXTENSION MODE FOR WIRELESS LANS COMPLYING WITH SHORT INTERFRAME SPACE REQUIREMENT

CROSS-REFERENCE TO RELATED APPLICATIONS

This application claims the benefit of U.S. Provisional Application No. 60/333,579, filed Nov. 27, 2001, which is hereby incorporated by reference.

FIELD OF THE INVENTION

The present invention relates to wireless local area networks (WLANs), and more particularly to transmitters, receivers and/or transceivers of WLANs.

BACKGROUND OF THE INVENTION

A wireless local area network (WLAN) uses radio frequency (RF) signals to transmit and receive data between electronic devices. WLANs provide all of the features and benefits of traditional hard-wired LANs without requiring cable connections between the devices. Referring now to FIG. 1, an infrastructure-based WLAN 10 includes a wireless access point 11 that provides a transparent connection between stations 12-1, 12-2, ..., and 12-$n$ and a network 14. The network 14 typically includes a distributed communication system 16 such as an Ethernet and one or more servers 18.

The access point 11 is the wireless equivalent of a hub. The access point 11 communicates with the wireless stations 12 using antennas 22. The access point 11 maintains the connections to the stations 12 that are located in a coverage area 24. The access point 11 also typically handles security by granting or denying access to the network 14. Similarly, a wireless access point 32 provides a transparent connection between stations 34-1, 34-2, ..., and 34-$n$ and the network 14. The access point 32 also communicates with the wireless stations 34 using antennas 42. The wireless access point 32 maintains the connections to stations 34 that are located in a coverage area 42.

Referring now to FIG. 2, an independent WLAN 38 supports direct wireless communications between stations 40-1, 40-2, ..., and 40-$n$ in a coverage area 42. Referring now to FIG. 3, stations 50 include a controller 52, and a transceiver 54 that is connected to one or more antennas 56. The stations 50 include additional circuits 58 for processing transmit/receive signals and for performing various other common functions of stations 50. Referring now to FIG. 4, access points 60 also include a transceiver 64 that is connected to one or more antennas 66. Likewise, the access point 60 includes additional circuits 68 for processing transmit/receive signals and for performing various other common functions of access points 60.

Referring now to FIG. 5, a WLAN architecture 70 for stations 50 and the access point 60 is shown. The architecture 70 includes a media access control (MAC) sublayer 72 that communicates with a MAC layer manager 74. A physical layer convergence protocol (PLCP) sublayer 76 and a physical medium dependent (PMD) sublayer 78 communicate with a physical layer manager 80. IEEE sections 802.11, 802.11(a), and 802.11(b), which are hereby incorporated by reference, set forth other specifications and operating details of the WLAN architecture 70.

When multiple stations are located in a coverage area, they compete for access to a medium. In other words, only a single station can transmit data or acknowledge receipt of data at a time. Standards such as IEEE sections 802.11, 802.11(a), and 802.11b set forth a specific protocol for WLAN communications to accommodate contention between the devices for the medium.

Referring now to FIG. 6, a source station 90 transmits data 92. Following a short interframe space (SIFS), a destination station 96 generates an acknowledgment (ACK) 98. IEEE section 802.11 and other related sections set forth a maximum time interval for the destination station 96 to respond with the ACK 98. Other stations 100 must defer access during the transmission of the data 92 and for a period that is longer than the SIFS to avoid contention.

Referring now to FIG. 7, the SIFS is shown in further detail. The SIFS is defined as a nominal time that the MAC and PHY require to receive the last symbol of a frame, to process the frame, and to respond with a first symbol of a response frame. In other words, aSIFSTime=aRXRFDelay+aRXPLCPDelay+aMACProcessingDelay+aRxTxTurnaroundTime. For both 802.11 and 802.11(b), the nominal aSIFSTime is defined as 10 microseconds ($\mu$s).

In FIG. 7, D1 is equal to aRXRFDelay+aRXPLCPDelay, which corresponds to a receiver delay and a receiver processing delay, respectively. M1 is equal to aMACProcessingDelay, which is the processing delay of the MAC layer. RxTx is equal to the RxTxTurnaroundTime, which is the delay associated with a transition between receiver and transmitter modes.

In implementations that comply with IEEE section 802.11 and related sections, aSIFSTime must not vary from the defined nominal SIFS time value by more than 10% of the slot time. For both sections 802.11 and 802.11(b), aSIFSTime must be between 8 and 12 $\mu$s as measured on the medium to be compatible. These limitations on aSIFSTime prevent the use of advanced signal processing techniques. For example, Turbo coding, Reed-Solomon coding, convolutional code concatenated with Reed-Solomon coding, and other advanced error coding techniques are not possible when backward compatibility is required. These advanced signal processing techniques allow higher data rates and/or provide other advantages. However, the advanced signal processing techniques also require receiver processing time that is typically longer than the nominal aSIFSTime that is defined by IEEE 802.11 and related sections.

SUMMARY OF THE INVENTION

A method and apparatus according to the invention provide a wireless local area network (WLAN) with first and second WLAN transceivers that have advanced signal processing capabilities. An interframe period between data and an acknowledgement is required by the WLAN for compatibility. The interframe period is shorter than a duration that is required to perform the advanced signal processing. The first WLAN transceiver transmits a header and data. A first data field in the header is specified to enable the advanced signal processing at the second transceiver. A second data field defines a data time period and an extension time period.

In other features of the invention, the first data field is a signal portion of the header. The second data field is a length portion of the header. The first WLAN transceiver transmits data during the data time period and dummy data during the extension time period.

In yet other features, the second WLAN transceiver, that is located remotely from the first WLAN transceiver, receives the header. The second WLAN transceiver initiates receiver processing including the advanced signal processing during the extension time period.

In still other features, the advanced signal processing relates to error coding. Alternately, the advanced signal processing relates to at least one of Turbo coding, Reed-Solomon coding, and convolution coding.

In yet other features, the interframe period includes time that is allocated for receiver delay, receiver processing delay, media access control delay, and receiver/transmitter transition delay of the second WLAN transceiver. A time period for the receiver delay and the receiver processing delay are increased by the extension time period.

In still other features, the interframe period is specified by at least one of IEEE sections 802.11, 802.11(a), and 802.11 (b).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 illustrates timing of a short interframe space (SIFS) according to the prior art;

FIG. 8 illustrates a physical layer convergence protocol (PLCP) header followed by data according to the present invention;

FIG. 9 is a functional block diagram of a station according to the present invention;

DETAILED DESCRIPTION OF THE PREFERRED EMBODIMENTS

Figure 1:
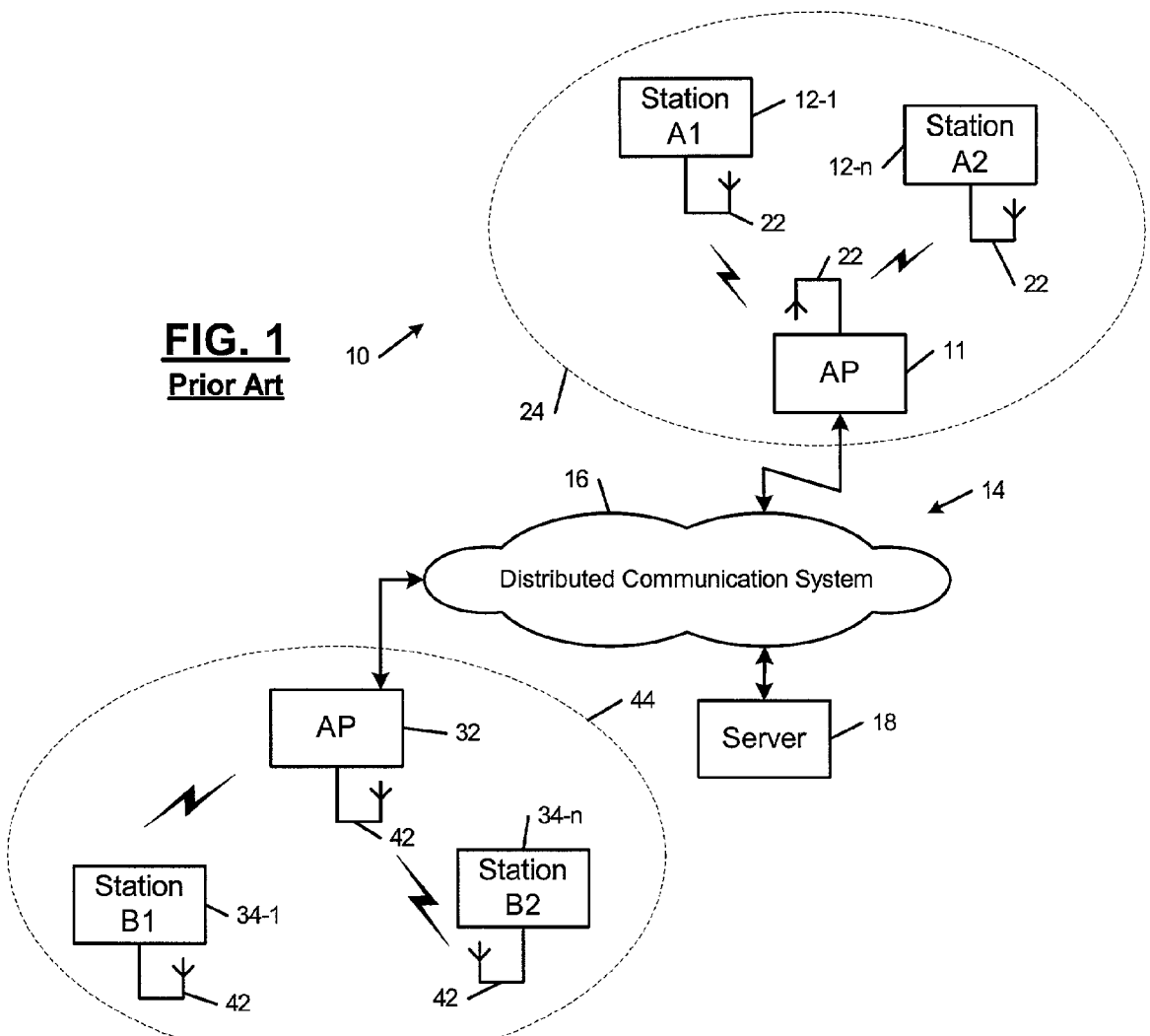
FIG. 1 is a functional block diagram of an infrastructure-based WLAN according to the prior art.

The following description of the preferred embodiment(s) is merely exemplary in nature and is in no way intended to limit the invention, its application, or uses.

Referring now to FIG. 8, a PLCP header 120 precedes data 122. The PLCP header 120 includes a signal portion 126, a service portion 128, a length portion 130, and a CRC portion 132. The signal portion 126 is typically 8 bits, the service portion 128 is typically 8 bits, the length portion is typically 16 bits, the CRC portion 132 is typically 16 bits, and the data 122 typically has a length between 64–2300 bytes.

Allowed values for the signal portion 126 are currently defined by the IEEE section 802.11 and other related sections as follows: "0A" (in hexadecimal) is for 1 Mbps; "14" is for 2 Mbps, "37" is for 5.25 Mbps, and "6E" is for 11 Mbps. According to the present invention, an additional code "XX" is used to indicate an extension mode. The additional code "XX" is a predetermined code that can be set equal to any unused hexadecimal code. For example, the additional code can be set to "8E" (hexadecimal).

A length portion 130 is typically used to define the number of microseconds that are required to transmit a PLCP service data unit (PSDU) or the data 122 when the signal portion 126 is set equal to "0A", "14", "37", or "6E". According to the present invention, the length portion 130 is set equal to a number of microseconds that are required to transmit the data 122 and an additional extension time $T_{ext}$ when the signal portion 126 is set equal to "XX".

Figure 10:
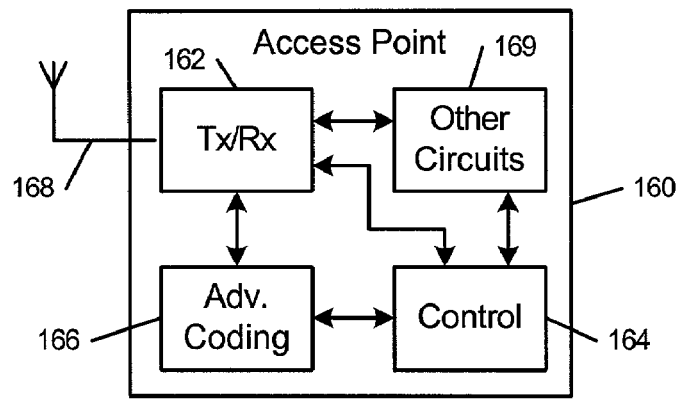
FIG. 10 is a functional block diagram of an access point according to the present invention.

Referring now to FIG. 9, a station 150 according to the present invention includes a transceiver 152, a controller 154, an advanced coding and decoding circuit 156, an antenna 158 and other circuits 159 that perform common station functions. Referring now to FIG. 10, access point 160 includes a transceiver 162, a controller 164, an advanced coding and decoding circuit 166, an antenna 168 and other circuits 169 that perform common functions of access points 160.

Figure 2:
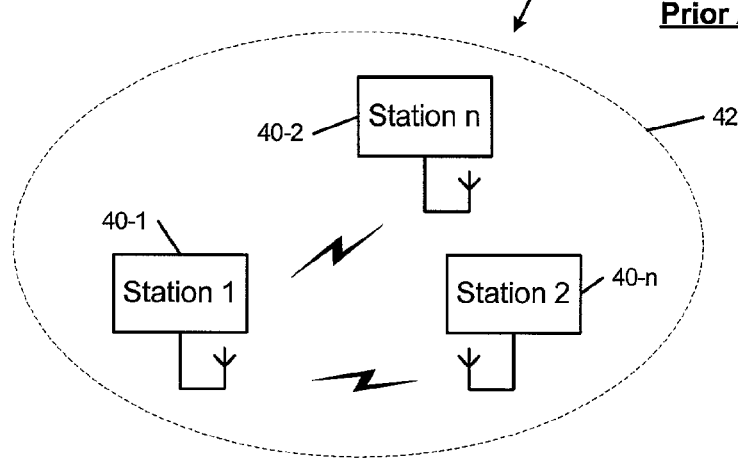
FIG. 2 is a functional block diagram of an independent WLAN according to the prior art.
Figure 3:
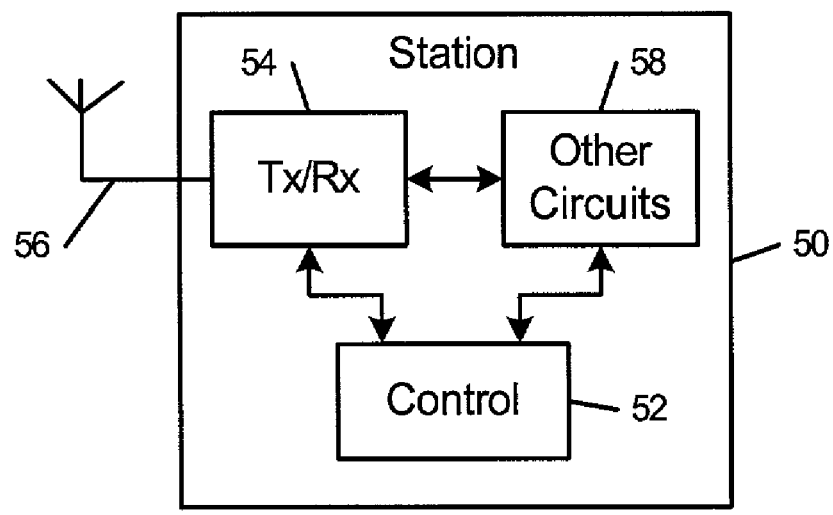
FIG. 3 is a functional block diagram of a station according to the prior art.
Figure 4:
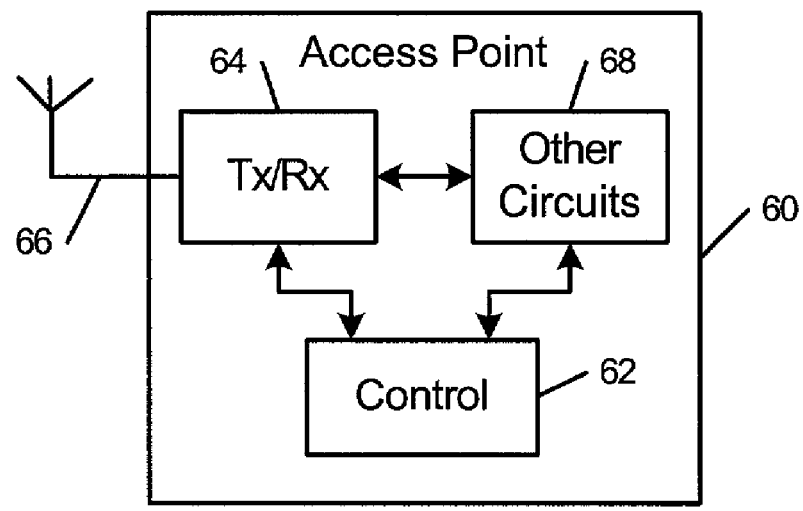
FIG. 4 is a functional block diagram an access point according to the prior art.
Figure 5:
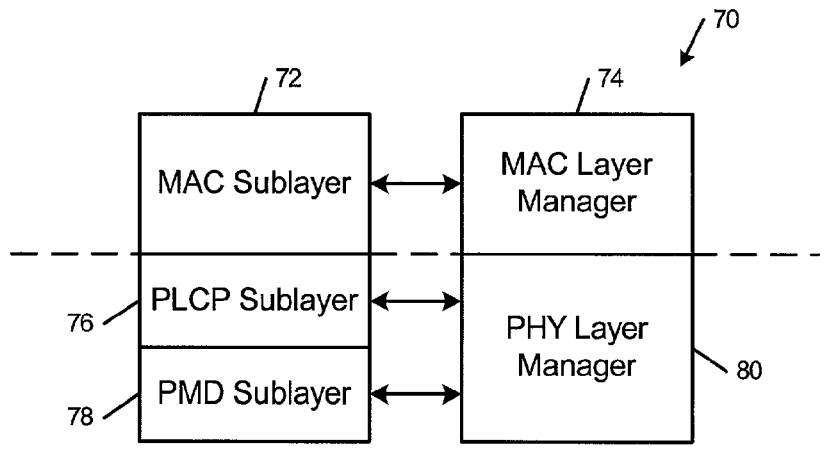
FIG. 5 is a functional block diagram of a WLAN architecture according to the prior art.
Figure 6:
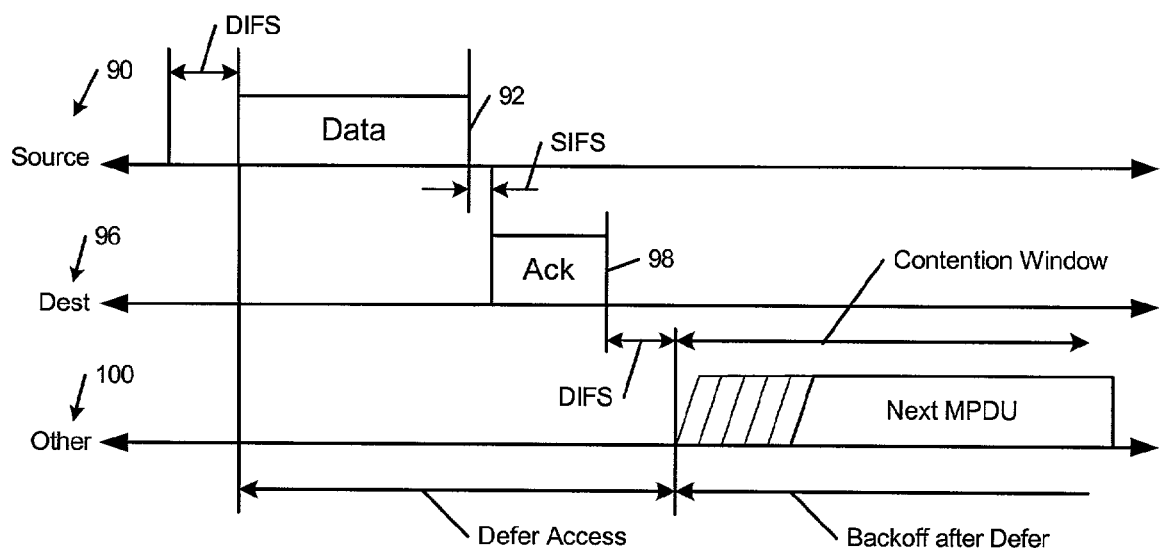
FIG. 6 illustrates timing of data and acknowledgment signals according to the prior art.
Figure 11:
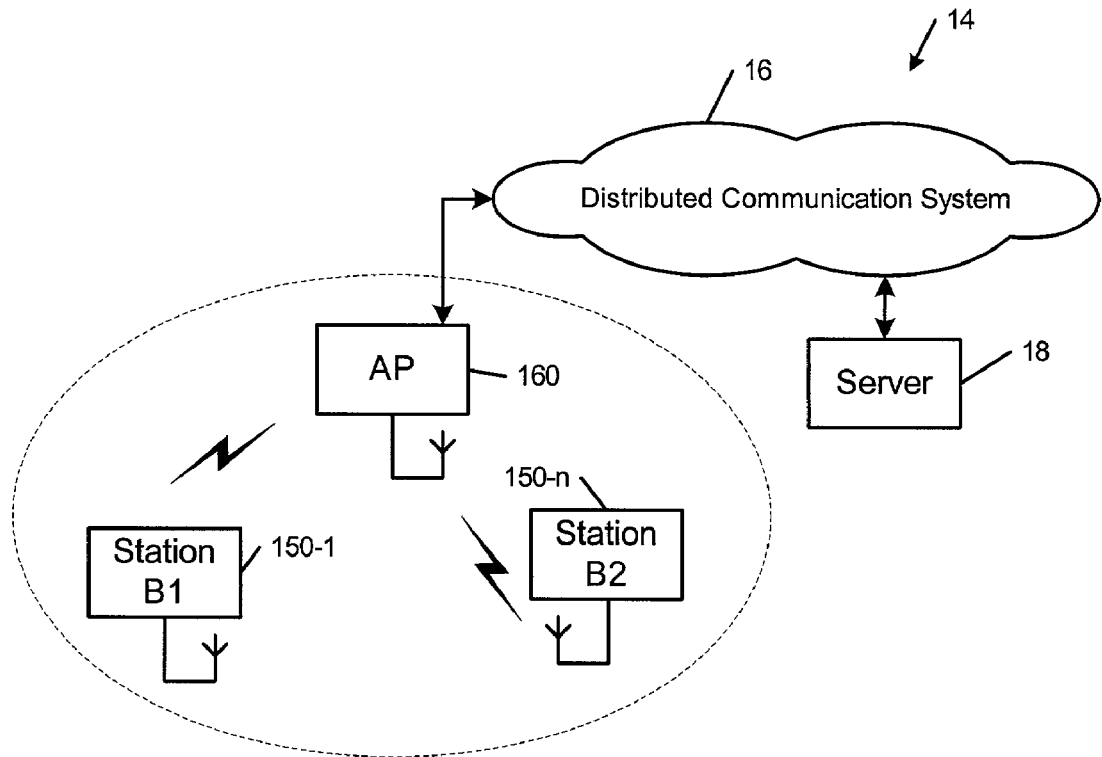
FIG. 11 is a functional block diagram of an infrastructure-based WLAN according to the present invention.
Figure 12:
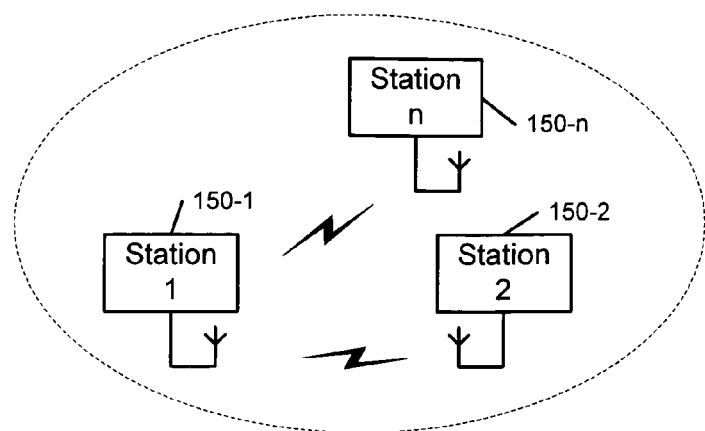
FIG. 12 is a functional block diagram of an independent WLAN according to the present invention.

Referring now to FIG. 11, the present invention will be described in the context of a wireless RF signal that is originated by the access point 160 and that is intended for the station 150-1 in FIG. 11. Reference numbers from FIGS. 1 and 2 have been used in FIG. 11 to identify similar elements. Skilled artisans can appreciate that the RF signal can be initiated by the station 150-1 and be intended for the access point 160. In FIG. 12, the RF signals can also be generated between stations 150-1 and 150-2.

Figure 13:
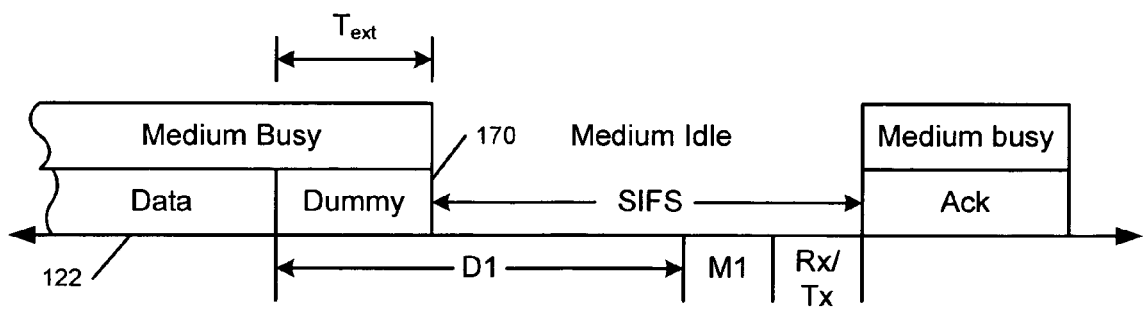
FIG. 13 illustrates timing of data, dummy data, D1, SIFS, and acknowledgment (ACK) according to the present invention.

Referring now to FIG. 13, when the transmitter 162 is operating in the extension mode, the transmitter 162 sets the signal portion 126 equal to "XX". In addition, the length portion 130 is set equal to the number of microseconds for the data 122 and the extension time $T_{ext}$. Dummy data 170 is inserted at the end of the data 122. The dummy data 170 is sent during the extension time $T_{ext}$. The extension time $T_{ext}$ is used to extend the duration of D1 and to allow advanced signal processing such as advanced error coding for extension mode capable devices.

The transceiver 152 receives the PLCP header 120 with the signal portion 126 and the length portion 130 that specify the extension mode. Upon receiving the PLCP header correctly, the transceiver knows from the length portion 130 that there is a packet being transmitted and that the transmission requires the time that is specified in the length portion. The target station or access point knows that valid data ends a period $T_{ext}$ before the time that is specified in the length field of the PLCP header 120.

As can be appreciated, other stations and/or access points are not impacted by the extension mode. For stations and access points without the extension mode capability, the data 122 ends after the dummy data 170. In other words, the physical carrier sense or energy detection of other stations or access points will indicate a clear channel assessment (CCA) busy signal during the period $T_{ext}$. This CCA busy state remains until after the transmission of the dummy data 170 ends. Therefore, the SIFS time requirements of IEEE section 802.11 and other related sections are still met while providing backward compatibility.

The present invention provides a solution for advanced signal processing that is transparent to the MAC layer. Therefore, there is no need to change IEEE section 802.11 MAC layer specifications to accommodate the extension mode. The dummy data 170 causes a negligible efficiency loss because the length of the dummy data 170 is much smaller than a typical length of the data 122.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for providing advanced signal processing in a wireless local area network that requires an interframe period between data and an acknowledgement for compatibility, wherein a duration of said interframe period is shorter than a duration that is required to perform said advanced signal processing, comprising:
   transmitting a header using a first transceiver;
   specifying a first data field in said header that enables said advanced signal processing mode; and
   specifying a second data field in said header that defines a data time period and an extension time period, wherein said extension time period is associated with dummy data transmission.

2. The method of claim 1 wherein said first data field is a signal portion of said header.

3. The method of claim 1 wherein said second data field is a length portion of said header.

4. The method of claim 1 further comprising transmitting data after said header during said data time period.

5. The method of claim 1, further comprising receiving said header portion at a second transceiver that is located remotely from said first transceiver.

6. The method of claim 5 further comprising initiating receiver processing associated with said advanced signal processing mode during said extension time period.

7. The method of claim 1 wherein said advanced signal processing mode includes advanced error coding.

8. The method of claim 1 wherein said advanced signal processing mode includes at least one of Turbo coding, Reed-Solomon coding, and convolution coding.

9. The method of claim 1 wherein said interframe period includes time allocated for receiver delay, receiver processing delay, media access control delay, and receiver/transmitter transition delay.

10. The method of claim 9 wherein a time period for said receiver delay and said receiver processing delay are increased by said extension time period.

11. The method of claim 1 wherein said interframe period is specified by at least one of IEEE section 802.11, 802.11(a) and 802.11(b).

12. The method of claim 1 wherein said extension time period allows additional processing time for said advanced signal processing mode.

13. The method of claim 1 wherein said extension time period allows for said advanced signal processing mode without extending said interframe period.

14. A method for operating a wireless local area network (WLAN), comprising:
   providing a first WLAN transceiver with advanced signal processing capabilities;
   providing a second WLAN transceiver with advanced signal processing capabilities, wherein a maximum interframe period between data and an acknowledgement is required for compatibility, and wherein a duration of said interframe period is shorter than a duration that is required to perform said advanced signal processing mode;
   transmitting a header and data using said first WLAN transceiver;
   specifying a first data field in said header that enables indicates said advanced signal processing mode; and
   specifying a second data field in said header that defines a data time period and an extension time period, wherein said extension time period is associated with dummy data transmission.

15. The method of claim 14 wherein said first data field is a signal portion of said header.

16. The method of claim 14 wherein said second data field is a length portion of said header.

17. The method of claim 14 further comprising transmitting data after said header during said data time period.

18. The method of claim 17 further comprising transmitting dummy data after said data during said extension time period.

19. The method of claim 18 further comprising receiving said header portion at said second WLAN transceiver that is located remotely from said first WLAN transceiver.

20. The method of claim 19 further comprising initiating receiver processing associated with said advanced signal processing mode during said extension time period.

21. The method of claim 14 wherein said advanced signal processing includes advanced error coding.

22. The method of claim 14 wherein said advanced signal processing includes at least one of Turbo coding, Reed-Solomon coding, and convolution coding.

23. The method of claim 14 wherein said interframe period includes time allocated for receiver delay, receiver processing delay, media access control delay, and receiver/transmitter transition delay.

24. The method of claim 23 wherein a time period for said receiver delay and said receiver processing delay are increased by said extension time period.

25. The method of claim 14 wherein said interframe period is specified by at least one of IEEE sections 802.11, 802.11(a) and 802.11(b).

26. A method for providing advanced signal processing in a wireless local area network that requires an interframe period between data and an acknowledgement for compatibility, wherein a duration of said interframe period is shorter than a duration that is required to perform said advanced signal processing, comprising:
   transmitting a header using a first transceiver;
   specifying a first data field in said header that indicates an advanced signal processing mode; and
   specifying a second data field in said header that defines a data time period and an extension time period, which provides additional processing time for said advanced signal processing mode, wherein said extension time period is associated with dummy data transmission.

27. The method of claim 26 wherein said extension time period allows additional processing time for said advanced signal processing mode.

28. The method of claim 26 wherein said extension time period allows for said advanced signal processing mode without extending said interframe period.

29. A method for operating a wireless local area network (WLAN), comprising:
providing a WLAN transceiver with advanced signal processing capabilities, wherein a maximum interframe period between data and an acknowledgement is required for compatibility, and wherein a duration of said interframe period is shorter than a duration that is required to perform said advanced signal processing mode; and
receiving a header and data via said WLAN transceiver;
wherein said header specifies a first data field, which indicates said advanced signal processing mode, and specifies a second data field, which defines a data time period and an extension time period, wherein said extension time period is associated with dummy data transmission.

* * * * *

UNITED STATES PATENT AND TRADEMARK OFFICE
CERTIFICATE OF CORRECTION

PATENT NO. : 7,239,648 B1  Page 1 of 1
APPLICATION NO. : 10/080454
DATED : July 3, 2007
INVENTOR(S) : Weishi Feng et al.

It is certified that error appears in the above-identified patent and that said Letters Patent is hereby corrected as shown below:

Column 3, Line 35      Insert -- of -- after "diagram"
Column 6, Line 12      Delete "enables" after "that"

Signed and Sealed this

Thirteenth Day of May, 2008

JON W. DUDAS
*Director of the United States Patent and Trademark Office*